United States Patent
Rajput et al.

(10) Patent No.: US 12,041,078 B2
(45) Date of Patent: Jul. 16, 2024

(54) METHODS, SYSTEMS, AND COMPUTER READABLE MEDIA FOR REDUCING THE LIKELIHOOD OF SUCCESSFUL DENIAL OF SERVICE (DoS) ATTACKS BY VALIDATING OVERLOAD CONTROL INFORMATION (OCI) SCOPE AGAINST NETWORK FUNCTION (NF) PROFILE INFORMATION OBTAINED USING TARGET RESOURCE IDENTIFICATION INFORMATION

(71) Applicant: Oracle International Corporation, Redwood Shores, CA (US)

(72) Inventors: Jay Rajput, Bangalore (IN); Virendra Singh, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 133 days.

(21) Appl. No.: 17/468,117

(22) Filed: Sep. 7, 2021

(65) Prior Publication Data
US 2023/0072290 A1 Mar. 9, 2023

(51) Int. Cl.
H04L 29/06 (2006.01)
H04L 9/40 (2022.01)
(52) U.S. Cl.
CPC ...... H04L 63/1458 (2013.01); H04L 63/0281 (2013.01); H04L 63/123 (2013.01)
(58) Field of Classification Search
CPC .............. H04L 63/1458; H04L 63/0281
See application file for complete search history.

(56) References Cited

U.S. PATENT DOCUMENTS

2021/0112443 A1 4/2021 Krishnan et al.
2021/0306907 A1* 9/2021 Landais .............. H04L 67/1008
(Continued)

FOREIGN PATENT DOCUMENTS

WO WO 2021/160774 A1 8/2021

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

(Continued)

*Primary Examiner* — Phy Anh T Vu
(74) *Attorney, Agent, or Firm* — Jenkins, Taylor & Hunt, P.A

(57) ABSTRACT

The subject matter described herein includes a method for reducing the likelihood of successful denial of service (DoS) attacks by validating overload control information (OCI) scope information against network function (NF) profile information obtained using target resource identification information. The method includes receiving a service based interface (SBI) request message, obtaining, from the SBI request message, target resource identification information, obtaining NF profile information using the target resource identification information and storing the NF profile information, receiving an SBI response message including overload control information and scope information for the overload control information, using the stored NF profile information to determine whether the scope information for the overload control information is valid, and, in response to determining that the scope information for the overload control information is invalid, rejecting the SBI response message.

18 Claims, 7 Drawing Sheets

(56) References Cited

U.S. PATENT DOCUMENTS

| | | | | |
|---|---|---|---|---|
| 2021/0410057 A1* | 12/2021 | Abtin | ............... | H04L 41/5058 |
| 2022/0053372 A1* | 2/2022 | Shekhar | ............. | H04L 67/1001 |
| 2022/0263793 A1* | 8/2022 | Baker | ................ | H04L 61/2514 |
| 2022/0287089 A1* | 9/2022 | Singh | .................. | H04W 72/51 |
| 2022/0345486 A1* | 10/2022 | Rajput | ................ | H04L 9/3239 |
| 2022/0360989 A1* | 11/2022 | Rajput | ................ | H04L 9/0643 |
| 2023/0022955 A1* | 1/2023 | Rajput | ................ | H04L 67/566 |

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.3.0, pp. 1-108 (Jun. 2021).

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 646 (Mar. 2021).

"3rd Generation Partnership Project; Technical Specification Group Services and System Aspects; Network Domain Security (NDS); Authentication Framework (AF) (Release 16)", 3GPP TS 33.310, V16.8.0, pp. 1-60 (Jun. 2021).

"3rd Generation Partnership Project; Technical Specification Group Services and System Aspects; Security Aspects; Study on Security Aspects of the 5G Service Based Architecture (SBA) (Release 16)", 3GPP TR 33.855, V1.7.0, pp. 1-101 (Aug. 2019).

Notification of Transmittal of the International Search Report and the Written Opinion of the International Searching Authority, or the Declaration for International Application No. PCT/US2022/039977 (Nov. 28, 2022).

Holtmanns, "5G Core Network Slicing Attacks GSMA CVD-2021-0047," Adaptive Mobile Security, pp. 1-12 (Mar. 1, 2021).

"A Slice in Time: Slicing Security in 5G Core Networks," White Paper, Adaptive Mobile Security, pp. 1-36 (2021).

\* cited by examiner

METHODS, SYSTEMS, AND COMPUTER READABLE MEDIA FOR REDUCING THE LIKELIHOOD OF SUCCESSFUL DENIAL OF SERVICE (DoS) ATTACKS BY VALIDATING OVERLOAD CONTROL INFORMATION (OCI) SCOPE AGAINST NETWORK FUNCTION (NF) PROFILE INFORMATION OBTAINED USING TARGET RESOURCE IDENTIFICATION INFORMATION

TECHNICAL FIELD

The subject matter described herein relates to reducing the likelihood of successful DoS attacks. More particularly, the subject matter described herein relates to methods, systems, and computer readable media for reducing the likelihood of successful DoS attacks by validating OCI scope information against NF profile information obtained using target resource identification information.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks can occur when a hacker sends overload control information with false overload control information scope to cause peer NFs to stop sending traffic to another NF. Overload control information is transmitted by an NF to a peer NF when the sending NF is overloaded to cause the NF to throttle traffic to the sending NF and allow the sending NF to shed load. The overload control information is communicated in an OCI header, which includes a scope component, the value of which identifies a scope (i.e., the peer network function identity or identities) to which the overload control information pertains. There is no validation of the information in the OCI header to confirm that the sending node is authorized to send the OCI information with the specified scope. Accordingly, there exists a need for improved methods, systems, and computer readable media for validating OCI scope information in a network.

SUMMARY

A method for reducing the likelihood of successful denial of service (DoS) attacks by validating overload control information (OCI) scope information against network function (NF) profile information obtained using target resource identification information includes steps performed at an NF including at least one processor. The steps include receiving a service based interface (SBI) request message. The steps further include obtaining, from the SBI request message, target resource identification information. The steps further include obtaining, using the target resource identification information, NF profile information and storing the NF profile information in memory of the NF. The steps further include receiving an SBI response message including overload control information and scope information for the overload control information. The steps further include using the stored NF profile information to determine whether the scope information for the overload control information is valid. The steps further include, in response to determining that the scope information for the overload control information is invalid, rejecting the SBI response message.

According to another aspect of the subject matter described herein, obtaining the target resource identification information includes reading values of one or more components of a 3gpp-Sbi-Target-apiRoot header of the SBI request message.

According to another aspect of the subject matter described herein, reading values of one or more attributes of the 3gpp-Sbi-Target-apiRoot header includes reading values of one or more components that correspond to attributes of an NF profile of a producer NF that hosts a target resource identified by the target resource identification information.

According to another aspect of the subject matter described herein, obtaining the NF profile information includes using the one or more of the values of the components of the 3gpp-Sbi-Target-ApiRoot header to perform a lookup in an NF profiles database and locate the NF profile of the NF that hosts the target resource.

According to another aspect of the subject matter described herein, reading the values of the one or more components of the 3gpp-Sbi-Target-apiRoot header that correspond to attributes of the NF profile of the producer NF that hosts the target resource includes reading the values of one or more of a scheme component, a fully qualified domain name (FQDN) component, a transport layer port component, an apiPrefix component, an apiName component, and an apiVersion component.

According to another aspect of the subject matter described herein, using the NF profile information to determine whether the scope information for the overload control information is valid includes comparing one or more of an NF-Instance ID, an NF-Set ID, an NF-Service-Instance-ID, an NF-Service-Set ID, a single network slice selection assistance information (S-NSSAI), a destination network name (DNN), a Callback uniform resource identifier (URI), and a service communications proxy (SCP) fully qualified domain name (FQDN) with values of corresponding components of a scope component of a 3gpp-Sbi-Oci header.

According to another aspect of the subject matter described herein, using the NF profile information to determine whether the scope information for the overload control information is valid includes determining that the scope information for the overload control information is invalid in response to determining that the NF profile information does not match the scope information for the overload control information.

According to another aspect of the subject matter described herein, using the NF profile information to determine whether the scope information for the overload control information is valid includes determining that the scope information for the overload control information is valid in response to determining that the NF profile information matches the scope information for the overload control information.

According to another aspect of the subject matter described herein, the NF comprises a service communications proxy (SCP).

According to another aspect of the subject matter described herein, the NF comprises a security edge protection proxy (SEPP) or a consumer NF.

According to another aspect of the subject matter described herein, a system for reducing the likelihood of successful denial of service (DoS) attacks by validating overload control information (OCI) scope information against network function (NF) profile information obtained using target resource identification information is provided. The system includes an NF including at least one processor and a memory. The system further includes an olcScope validator for receiving a service based interface (SBI) request message, obtaining, from the SBI request message, target resource identification information, obtaining, using the target resource identification information, NF profile information, storing the NF profile information in the memory, receiving an SBI response message including overload control information and scope information for the overload control information, using the stored NF profile information to determine whether the scope information for the overload control information is valid, and, in response to determining that the scope information for the overload control information is invalid, rejecting the SBI response message.

According to another aspect of the subject matter described herein, the olcScope validator is configured to obtain the target resource identification information by reading values of one or more components from a 3gpp-Sbi-Target-apiRoot header of the SBI request message.

According to another aspect of the subject matter described herein, the values of the one or more components of the 3gpp-Sbi-Target-apiRoot header comprise values that correspond to attributes of an NF profile of a producer NF that hosts a target resource identified by the target resource identification information.

According to another aspect of the subject matter described herein, the olcScope validator is configured to obtain the NF profile information by performing perform a lookup in an NF profiles database using values of one or more of the values of the attributes of the 3gpp-Sbi-Target-apiRoot header and locate the NF profile of the NF that hosts the target resource.

According to another aspect of the subject matter described herein, the values of the one or more components of the 3gpp-Sbi-Target-apiRoot header that correspond to attributes of the NF profile of the producer NF that hosts the target resource include values of one or more of a scheme component, a fully qualified domain name (FQDN) component, a transport layer port component, an apiPrefix component, an apiName component, and an apiVersion component.

According to another aspect of the subject matter described herein, the olcScope validator is configured to determine whether the scope information for the overload control information is valid by comparing the NF profile information with the scope information for the overload control information.

According to another aspect of the subject matter described herein, the olcScope validator is configured to determine that the scope information for the overload control information is invalid in response to determining that the NF profile information does not match the scope information for the overload control information.

According to another aspect of the subject matter described herein, the olcScope validator is configured to determine that the scope information for the overload control information is valid in response to determining that the NF profile information matches the scope information for the overload control information. According to another aspect of the subject matter described herein, the network function comprises a service communications proxy (SCP), a security edge protection proxy (SEPP), or a consumer NF.

According to another aspect of the subject matter described herein, a non-transitory computer readable medium having stored thereon executable instructions that when executed by a processor of a computer control the computer to perform steps is provided. The steps include receiving a service based interface (SBI) request message. The steps further include obtaining, from the SBI request message, target resource identification information. The steps further include obtaining, using the target resource identification information, NF profile information and storing the NF profile information in memory of the NF. The steps further include receiving an SBI response message including overload control information and scope information for the overload control information. The steps further include using the stored NF profile information to determine whether the scope information for the overload control information is valid. The steps further include, in response to determining that the scope information for the overload control information is invalid, rejecting the SBI response message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be described with reference to the accompanying drawings, of which.

DETAILED DESCRIPTION

Figure 1:
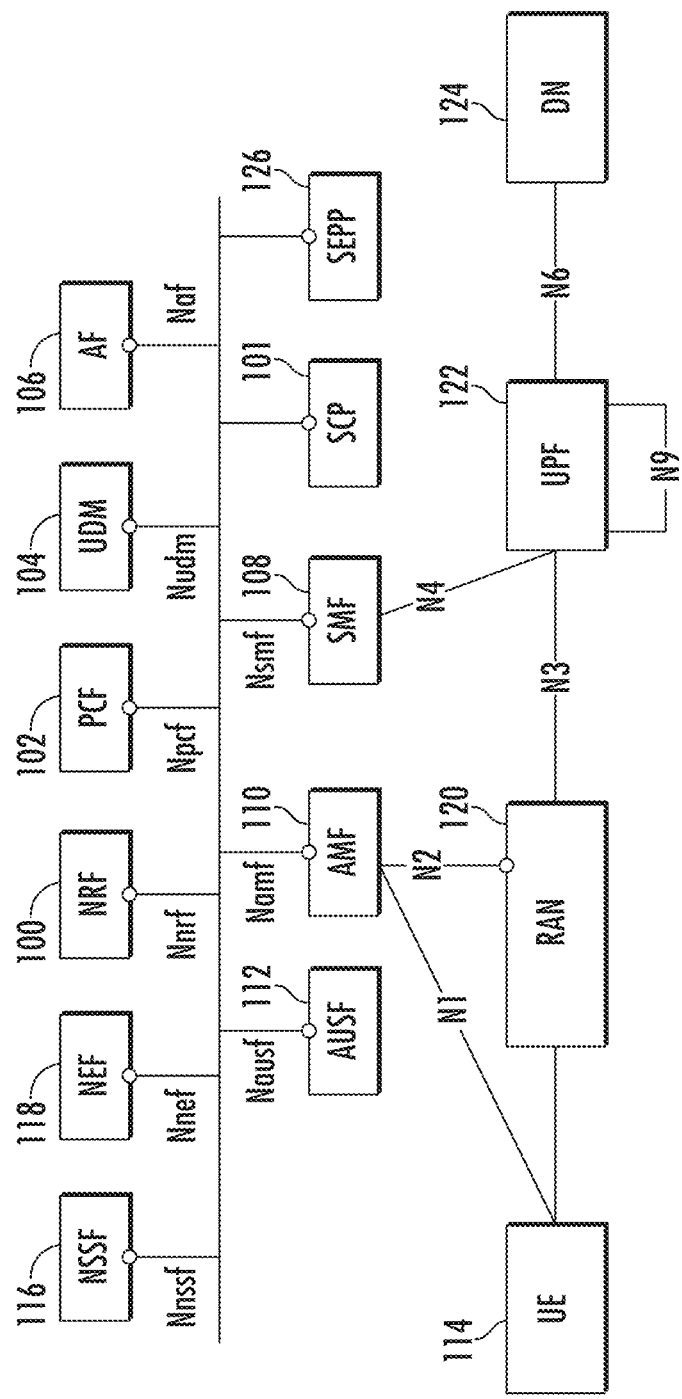
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G network is a DoS attack initiated by a hacker using false OCI information. 3GPP standards recommend overload control using an OCI header. When an NF service producer or consumer reaches an implementation-dependent overload threshold, the NF service producer or consumer conveys the OCI to its peer entity (consumer or producer, respectively). Based on the received OCI, the peer adjusts the signaling it sends to the overloaded entity according to the OCI. One issue with the OCI communication is that there is no validation if the OCI is from authorized entity. A hacker NF can send indication of overload for another NF, NF set, NF service, NF service set, S-NSSAI, DNN, callback URI, etc. Conveying false OCI information to an SBI message sender will shut the entity falsely identified by the OCI information out of the network. There is a need to make sure that the OCI header is not misused by a hacker and that only an authorized NF is able to indicate overload information in the OCI header for a given scope. The subject matter described herein includes a process by which an NF, such as an SCP, can mitigate this issue by performing validation that the peer entity sending the information in the OCI header is authorized to send the OCI header with the scope specified in the OCI header.

Table 1 shown below illustrates exemplary 3GPP terminology that will be used in describing the subject matter described herein.

TABLE 1

3GPP Terminology

| Term | Definition |
| --- | --- |
| NF Instance | An identifiable instance of the NF. An NF Instance may provide services offered by one or more NF service instances. |
| NF Service Instance | An identifiable instance of the NF service. |
| NF Service Set | A group of interchangeable NF service instances of the same service type within an NF instance. The NF service instances in the same NF service set have access to the same context data. |
| NF Set | A group of interchangeable NF instances of the same type, supporting the same services and the same network slice(s). The NF instances in the same NF set may be geographically distributed but have access to the same context data. |
| S-NSSAI | Single network slice selection assistance information. |
| DNN | Data network name. |

In Table 1, the terms in the left-hand column are the names of parameters that can be specified in the OlcScope component of the OCI header. For example, an OlcScope that specifies an NF set is communicating overload control information for an entire NF set. If such a parameter is falsified, the OCI information could cause the receiving NF to cease communications with all NF instances in the NF set.

Section 6.4 of 3GPP TS 29.500 recommends overload control using the OCI header. Overload control is a reactive mechanism to let the peer NF know to shed load when the sending NF is in an overloaded state. Section 5.2.3.2.9 of 3GPP TS 29.500 explains the OCI header. One mandatory component of the OCI header that is of interest to the subject matter described herein is the olcScope, the value of which can specify NF producer scope, NF consumer scope, or SCP scope. Each of the NF producer scope, NF consumer scope, and SCP scope is replaced by sub-parameters in the actual OCI header. For example, each of NF consumer, NF producer, and NF SCP scopes can be specified using the following sub-parameters:

```
nfProducerScope =  (("NF-Instance:" RWS nfinst)
    / ("NF-Set:" RWS nfset)
    / "(NF-Service-Instance:" RWS nfservinst)
    / ("NF-Service-Set:" RWS nfserviceset)) [";" RWS sNssai ";"
    RWS dnn]
nfConsumerScope = ("NF-Instance:" RWS nfinst RWS "Service-
    Name:" RWS servname])
    / ("NF-Set:" RWS nfset RWS "Service-Name:" RWS
    servname])
    / "(NF-Service-Instance:" RWS nfservinst)
    / ("NF-Service-Set:" RWS nfserviceset)
    / ("Callback-Uri:" RWS URI *( RWS "&" RWS URI))
scpScope =     ("SCP-FQDN:" RWS fqdn)
```

From the specification above, each of the defined NF service consumer and NF service producer scopes can identify an NF instance, an NF service instance, an NF set, or an NF service set. The SCP scope parameter can specify an FQDN. An S-NSSAI can also be specified in the olcScope. Any of these parameters can be used to identify the corresponding entity as overloaded.

The following are three of the examples of olcScope specified in Section 5.2.3.2.9 of 3GPP TS 29.500:

Example 1: Overload Control Information for an NF Instance

3gpp-Sbi-Oci: Timestamp: "Tue, 4 Feb. 2020 08:49:37 GMT"; Period-of-Validity: 75 s; Overload-Reduction-Metric: 50%; NF-Instance: 54804518-4191-46b3-955c-ac631f953ed8

Example 2: Overload Control Information for an NF Service Set

3gpp-Sbi-Oci: Timestamp: "Tue, 4 Feb. 2020 08:49:37 GMT"; Period-of-Validity: 120 s; Overload-Reduction-Metric: 50%; NF-Service-Set: setxyz.snnsmf-pdusession.nfi54804518-4191-46b3-955c-ac631f953ed8.5gc.mnc012.mcc345

Example 3: Overload Control Information for an SMF Instance Related to a Particular DNN of an S-NSSAI 3gpp-Sbi-Oci: Timestamp: "Tue, 4 Feb. 2020 08:49:37 GMT"; Period-of-Validity: 600 s; Overload-Reduction-Metric: 50%; NF-Instance: 54804518-4191-46b3-955c-ac631f953ed8; S-NSSAI: {"sst": 1, "sd": "A08923"}; DNN: internet.mnc012.mcc345.gprs In Example 1, 54804518-4191-46b3-955c-ac631f953ed8 is the value of the olcScope component that identifies the NF instance to which the overload control information applies. In Example 2, setxyz.snnsmf-pdusession.nfi54804518-4191-46b3-955c-ac631f953ed8.5gc.mnc012.mcc345 is the value of the olcScope component that identifies the NF service set to which the overload control information applies. In Example 3, internet.mnc012.mcc345.gprs is the value of the olcScope component that identifies the DNN to which the overload control information applies.

Table 2 shown below illustrates examples of olcScope defined in Section 6.4.3.4.5 of 3GPP TS 29.500.

TABLE 2

OlcScope Parameters Defined in 3GPP TS 29.500

| Scope Parameter | OlcScope (i.e., OCI applies to) | Comments |
| --- | --- | --- |
| NF instance | All services of the NF instance identified by the NF Instance ID. | Supported by producer, consumer |

TABLE 2-continued

OlcScope Parameters Defined in 3GPP TS 29.500

| Scope Parameter | OlcScope (i.e., OCI applies to) | Comments |
| --- | --- | --- |
| NF set | All services of all NF instances of the NF set identified by the NF Set ID. | Supported by producer, consumer |
| NF service instance | The service instance identified by the NF Service Instance ID. | Supported by producer, consumer |
| NF service set | All service instances of the NF service set identified by the NF service set ID. | Supported by producer, consumer |
| S-NSSAI | The network slice identified by the NSSAI. | Additional scope for SMF Producer |
| DNN | The destination network identified by the DNN. | Additional scope for SMF Producer |
| Callback URI | Callback URI of the NF service consumer | Supported by consumer |
| SCP FQDN | The SCP identified by the FQDN | Supported by SCP |

Another header defined in 3GPP TS 29.500 is the 3gpp-Sbi-Target-apiRoot header. According to Section 6.10.2.5 of 3GPP TS 29.500, for indirect communications with or without delegated discovery, the HTTP client shall include a 3gpp-Sbi-Target-apiRoot header set to the apiRoot of an authority server for the target resource, if available, in requests it sends to the SCP. In particular the client will include the 3gpp-Sbi-Target-apiRoot header in SBI requests transmitted using indirect communications without delegated discovery, after a resource has been created, in subsequent service requests sent to the SCP, and in notifications or callbacks sent via the SCP.

An SCP will also include a 3gpp-Sbi-Target-apiRoot header set to the apiRoot of an authority server for the target resource, if available, in requests it sends to the next hop SCP. The point to highlight is that the SCP can either find the target resource itself or deduce the target resource from the 3gpp-Sbi-Target-apiRoot header.

Figure 2:
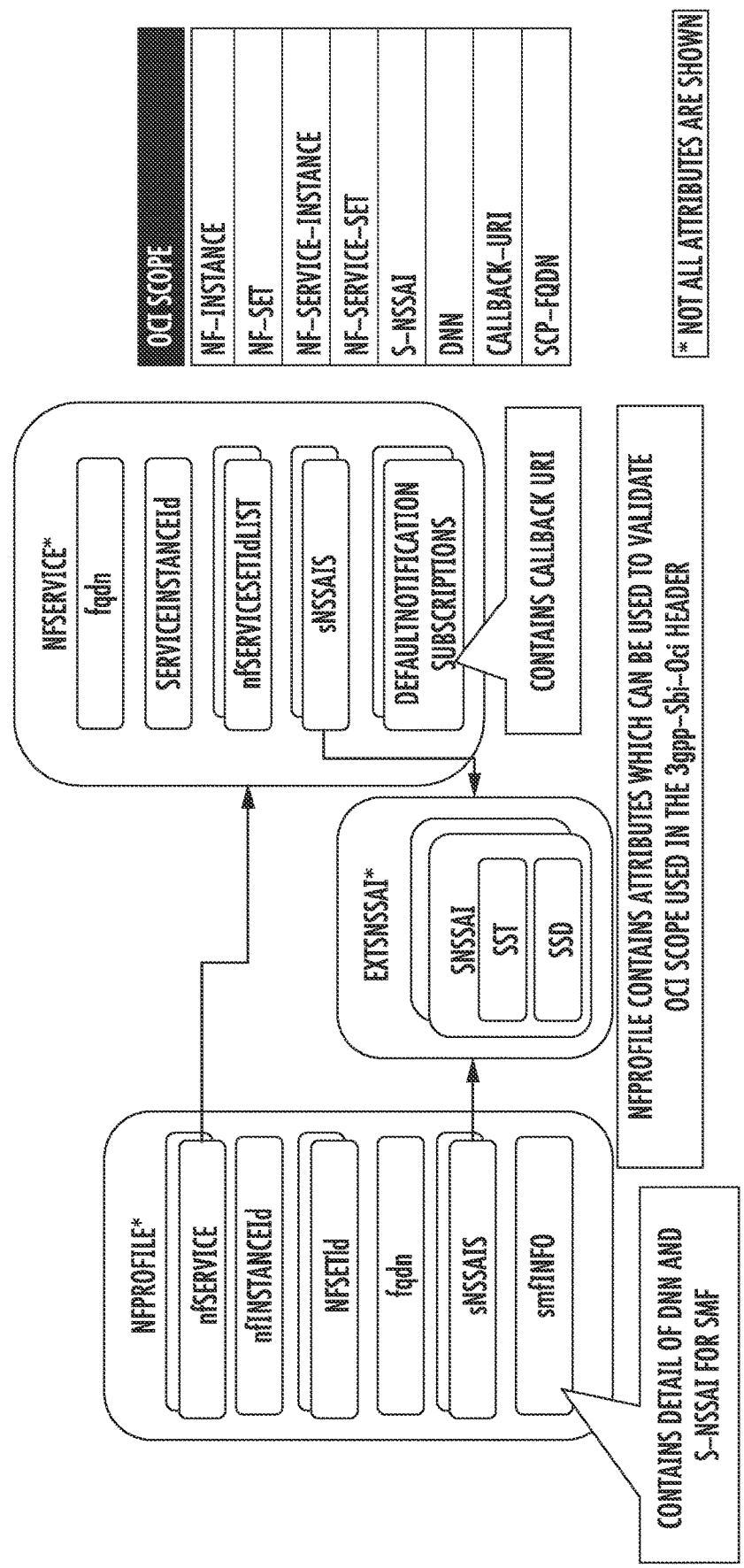
FIG. 2 is a block diagram illustrating exemplary attributes of an NF profile that that can be used to validate OCI scope information.

As will be described in detail below, the 3gpp-Sbi-Target-apiRoot header includes components that correspond to one or more attributes of the NF profile of the producer NF on which the target resource exists. The components of the 3gpp-Sbi-Target-apiRoot header that are common to the NF profile of the producer NF on which the target resource exists can be used to validate scope specified in the 3gpp-Sbi-Oci header. FIG. 2 is a block diagram illustrating exemplary parameters of an NF profile that can be used to validate scope information contained in the 3gpp-Sbi-Oci header. In FIG. 2, the NF profile includes an smfinfo attribute, which includes details of the destination network name (DNN) and single network slice selection assistance information (S-NSSAI) of the session management function (SMF). If the target resource identified by the 3gpp-Sbi-Target-apiRoot header is an SMF, the 3gpp-Sbi-Target-apiRoot header may be used to obtain the NF profile for the SMF, and the smfInfo attribute of the NF profile may be compared with the DNN and S-NSSAI in the scope component of the 3gpp-Sbi-Oci header.

Another NF profile attribute that may be used to validate the scope of component of the 3gpp-Sbi-Oci header is the defaultNoficationSubscriptions attribute, which contains the callback URI. The 3gpp-Sbi-Target-apiRoot header may be used to obtain the NF profile of the target resource, the callback URI may be read from the defaultNotificationSubscriptions attribute of the NF profile, and the callback URI obtained from the NF profile may be compared with the callback URI obtained from the scope component of the 3gpp-Sbi-Oci header. If the attribute values match, the OCI may be determined to be valid. If the attribute values do not match, the OCI may be determined to be invalid.

Other components of the OCI scope that can be compared with NF profile attributes obtained using the 3gpp-Sbi-Target-apiRoot header include the NF-Instance ID, the NF-Set ID, the NF-Service-Instance-ID, and NF-Service-SetID. Any one or more of the NF profile attributes listed in the table with the heading "OCI Scope" in FIG. 2 may be compared with corresponding attribute values from the scope component of the 3gpp-Sbi-Oci header to validate the OCI.

Figure 3:
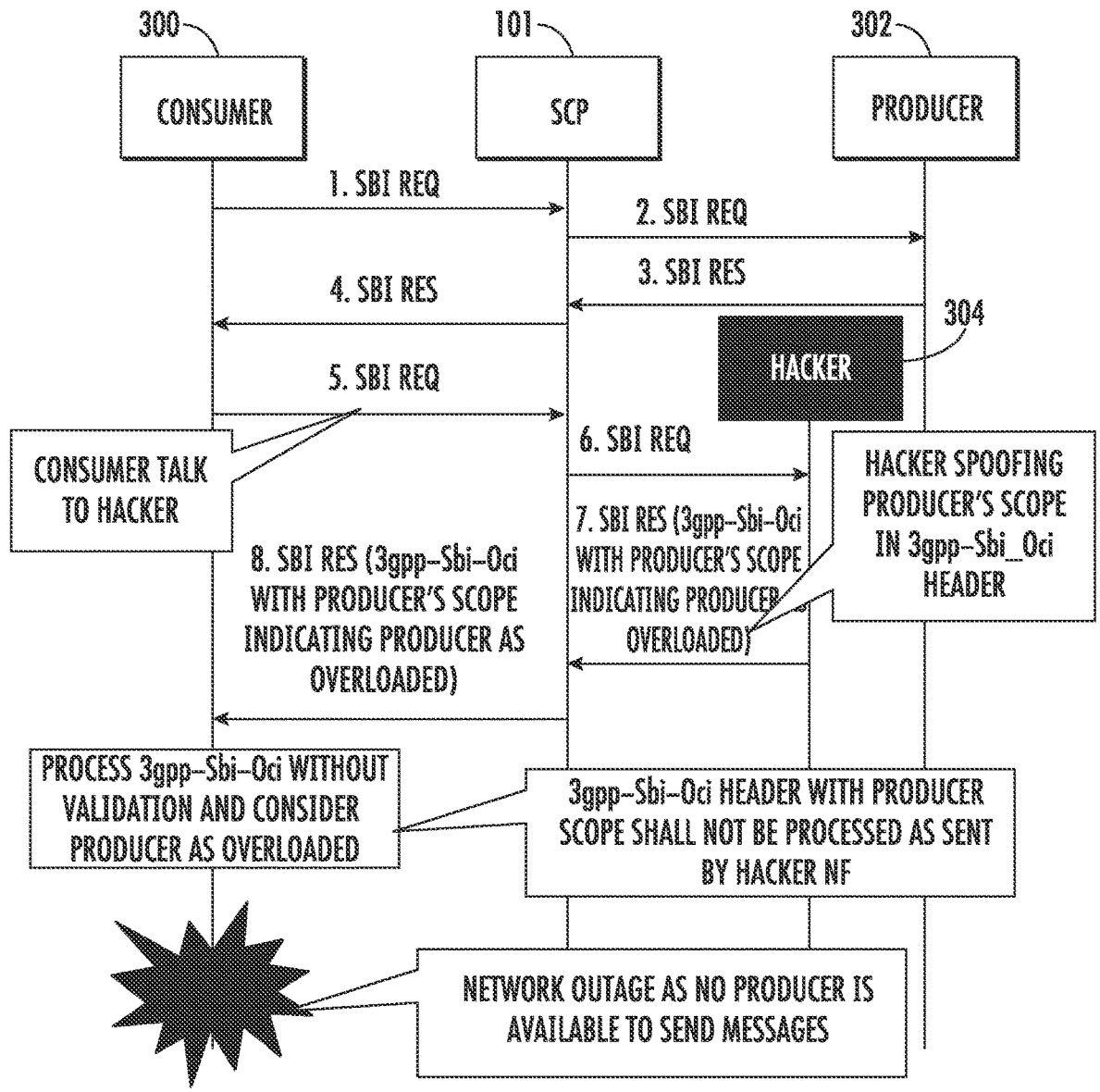
FIG. 3 is a message flow diagram illustrating exemplary messages exchanged where a hacker initiates a DoS attack using an SBI message with false OCI scope information.

FIG. 3 is a message flow diagram illustrating exemplary messages exchanged between a consumer NF, a producer NF, an SCP, and a hacker, where the hacker uses OCI to launch a denial of service attack. Referring to FIG. 3, in line 1, a consumer NF 300 sends an SBI request message to SCP 101. In line 2, SCP 101 forwards the SBI request message to producer NF 302. In line 3, producer NF 302 sends an SBI response message to SCP 101. In line 4, SCP 101 forwards the SBI response message to consumer NF 300. The communications model illustrated in lines 1-4 is called the indirect communications model because communications between consumer NF 300 and producer NF 302 occur via SCP 101.

In line 5, consumer NF 300 sends an SBI request message to SCP 101. In line 6, SCP 101 forwards the SBI request message to hacker 304. In this example, hacker 304 may be a producer NF or a node impersonating a producer NF that provides service in the network. In line 7 of the message flow diagram, hacker 304 sends an SBI response to SCP 101. The SBI response includes a 3gpp-Sbi-Oci header that identifies producer NF 302 in its scope component, indicating that producer NF 302 is overloaded. In line 8, SCP 101 sends an SBI response message to consumer NF 300 with the 3gpp-Sbi-Oci header identifying producer NF 302 has being overloaded. Consumer NF 300, in response to receiving the SBI response with the 3gpp-Sbi-Oci header indicating that producer NF 302 is overloaded, will cease communicating with producer NF 302. If producer NF 302 provides essential services in the network and is the only provider of such services, a network outage may occur. For example, if producer NF 302 is the only AMF providing access and mobility management services in the network and is rendered unavailable to consumer NF 300 based on the OCI sent by hacker 304, UEs seeking to access the network may be unable to do so.

Figure 4:
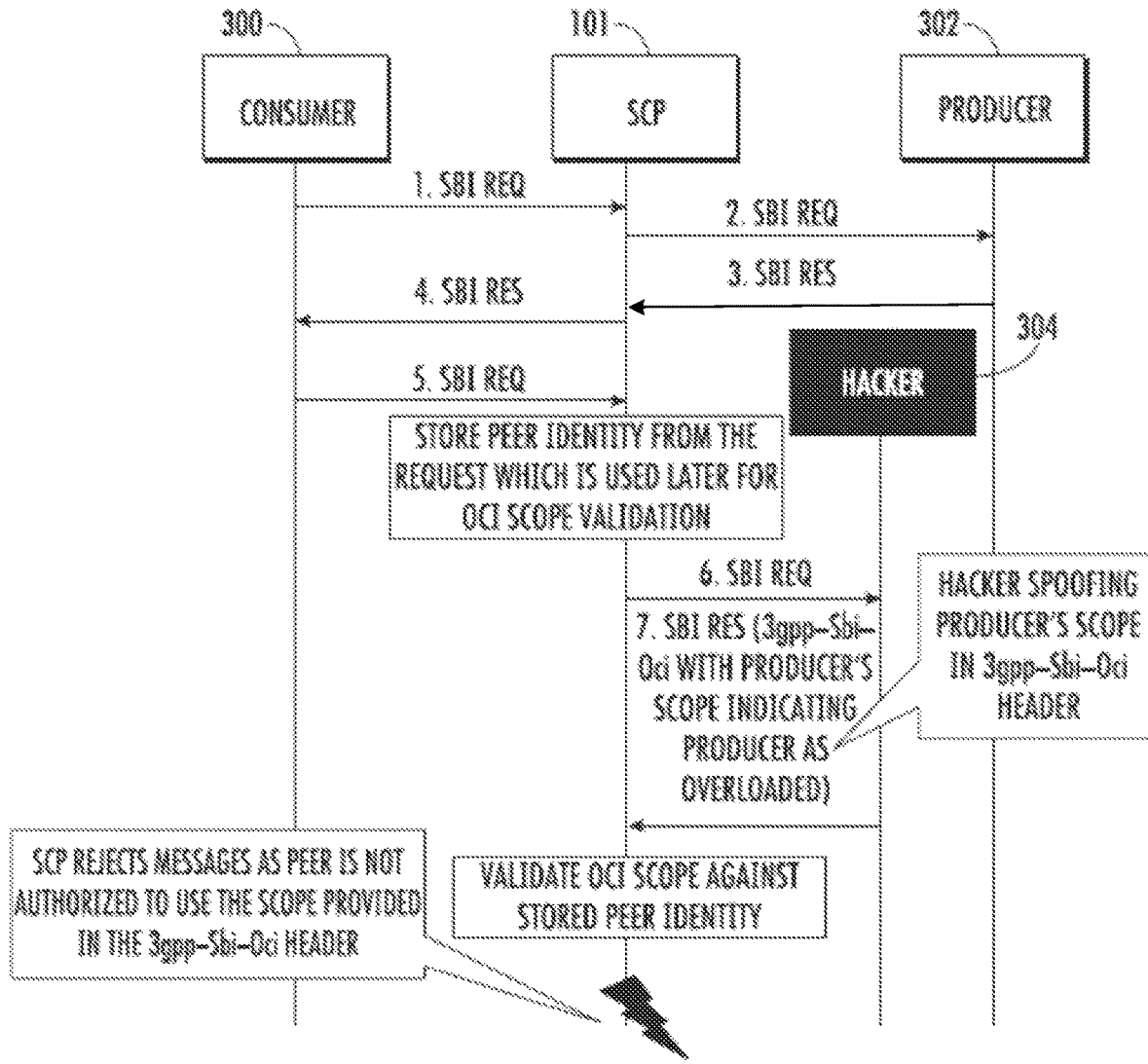
FIG. 4 is a message flow diagram illustrating exemplary messages exchanged for reducing the likelihood of a successful DoS attack by validating OCI scope information against NF profile information obtained using target resource identification information.

To avoid or reduce the likelihood of a successful DoS attack, such as that illustrated in FIG. 3, the SCP or other NF described herein may use information from an SBI request message to obtain NF profile information that identifies the SBI producer that is the target of the SBI request and may use the stored information to validate scope information in the OCI header received in an SBI response. FIG. 4 is a message flow diagram illustrating exemplary messages exchanged when the SCP uses NF profile information obtained using target resource identification information from an SBI request to validate scope information in an OCI header of an SBI response. Referring to FIG. 4, in line 1, consumer NF 300 sends an SBI request message to SCP 101. In line 2, SCP 101 forwards the SBI request message to producer NF 302. In line 3, producer NF 302 sends an SBI response message to SCP 101. In line 4, SCP 101 forwards the SBI response message to consumer NF 300.

In line 5, consumer NF 300 sends an SBI request message to SCP 101. SCP 101 stores peer identity information from the SBI request. In this case, the peer identity information is one or more NF profile attributes of hacker 304 determined from the 3gpp-Sbi-Target-apiRoot header of the SBI request message. In line 6, SCP 101 forwards the SBI request message to hacker 304. In line 7 of the message flow diagram, hacker 304 sends an SBI response to SCP 101. The SBI response includes a 3gpp-Sbi-Oci header that identifies producer NF 302 in its scope component, indicating that producer NF 302 is overloaded. Rather than forwarding the SBI response message to consumer NF 300, SCP 101 validates the entity identified in the olcScope component of the 3gpp-Sbi-Oci header against NF profile information obtained or determined from the 3gpp-Sbi-Target-apiRoot header of the SBI request. In this example, the stored NF profile information determined from the 3gpp-Sbi-Target-apiRoot header is an identity of hacker 304. However, the peer identity from the OlcScope parameter identifies producer NF 302. Because the identities do not match, SCP 101 rejects the SBI response message because hacker 304 is not authorized to send OCI information for the scope specified in the 3gpp-Sbi-Oci header. Because SCP 101 rejects the SBI request response message with unauthorized OlcScope, the likelihood of a successful DoS attack on producer NF 302 is reduced.

Figure 5:
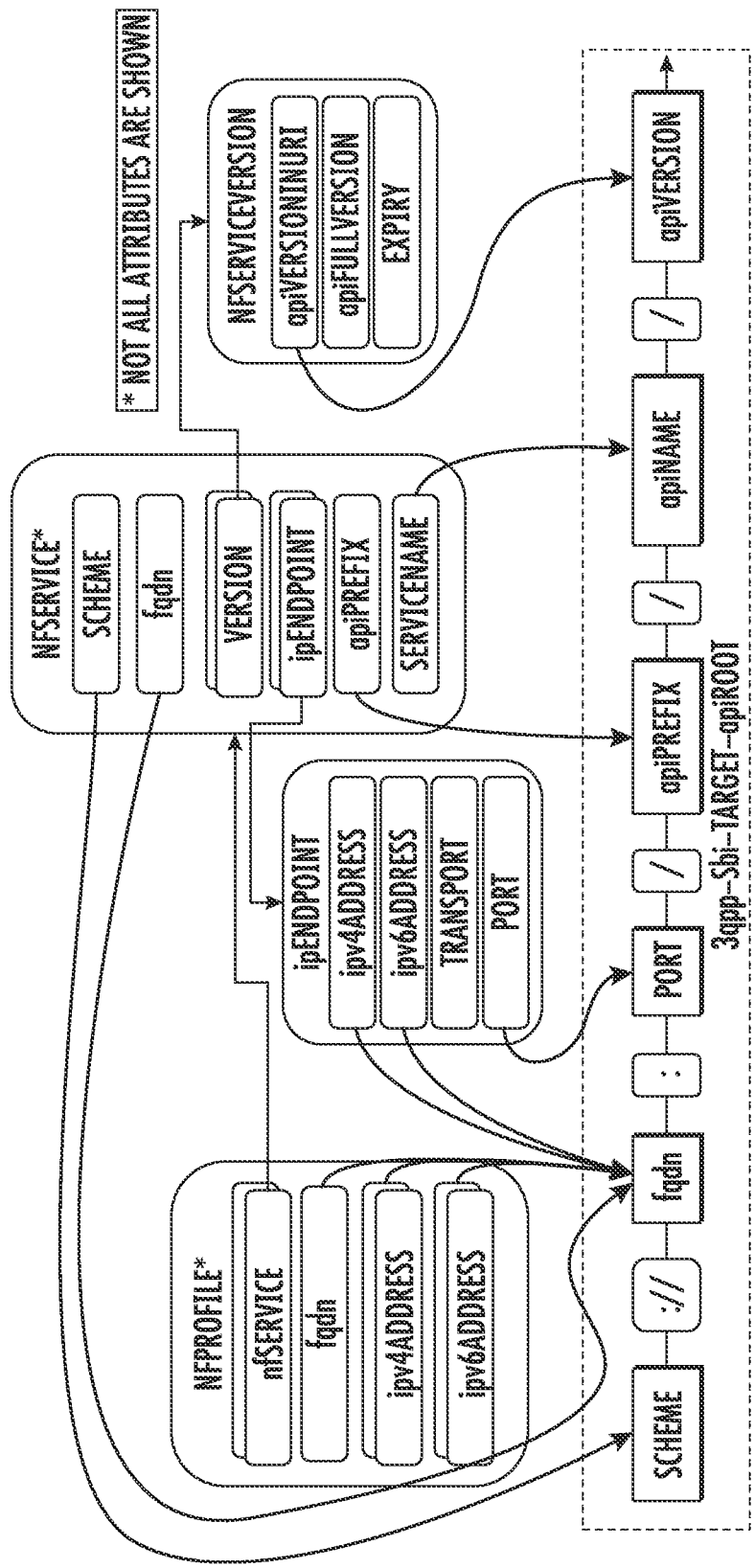
FIG. 5 is a block diagram illustrating exemplary mappings between 3gpp-Sbi-Target-apiRoot header components and NF profile attributes that can be used by an SCP or other NF to validate OCI scope information.
Figure 6:
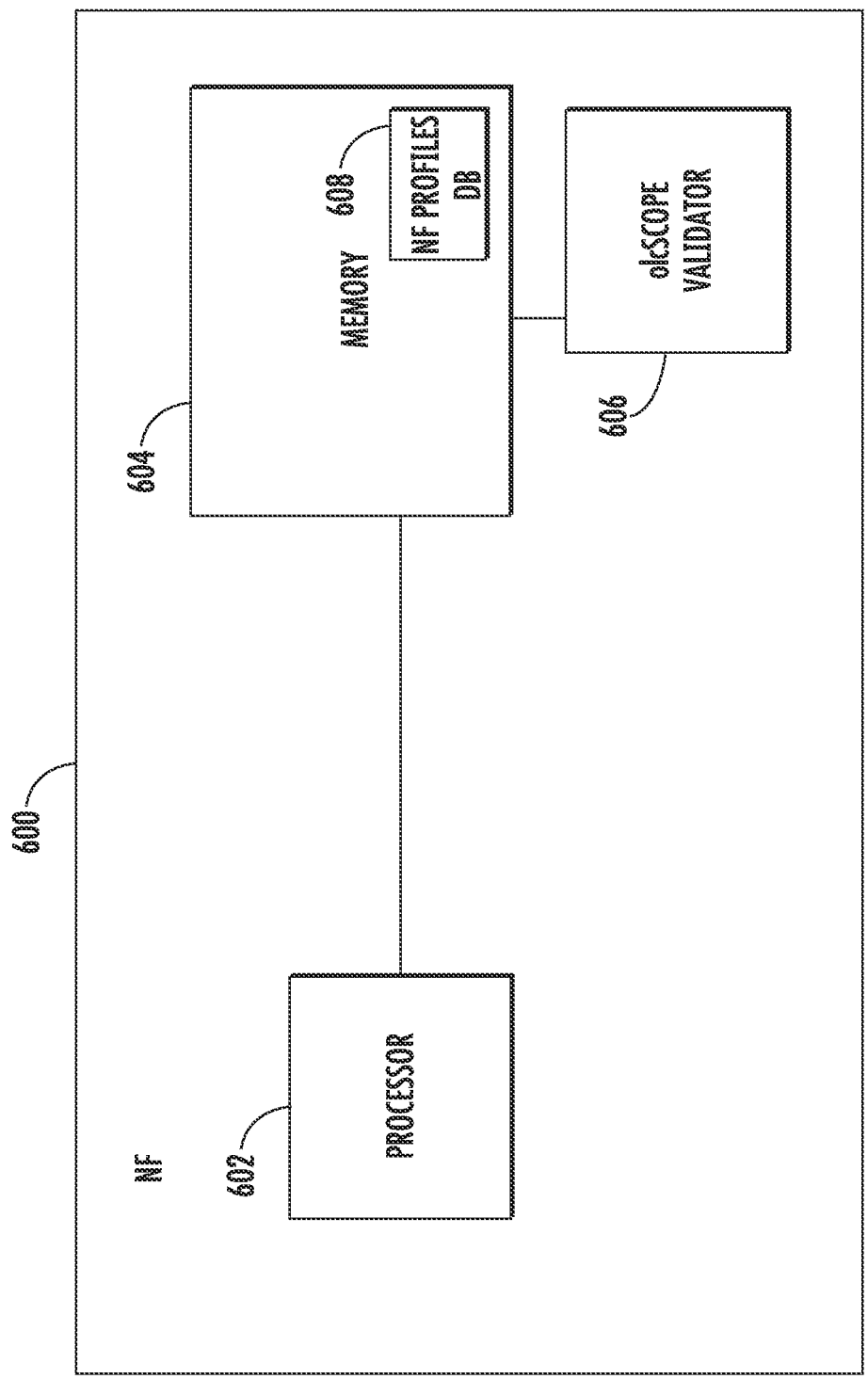
FIG. 6 is a block diagram illustrating an exemplary architecture for an NF for validating OCI scope information to reduce the likelihood of successful DoS attacks.

FIG. 5 is a block diagram illustrating exemplary mappings between NF profile attributes and 3gpp-Sbi-Target-apiRoot header components. The SCP may utilize any one of more of the components from the 3gpp-Sbi-Target-apiRoot header to identify the NF profile of the target resource and obtain the parameters illustrated in FIG. 2 to validate overload control information scope. For example, SCP 101 may use values of one or more of scheme, FQDN, port, apiPrefix, apiName, and apiVersion from the 3gpp-Sbi-Target-apiRoot header to perform a lookup in an NF profiles database and obtain the NF profile of the NF on which the target resource reside. The SCP may then read the NF profile attributes illustrated in FIG. 2, compare these attributes to values of corresponding attributes from the scope component of the 3gpp-Sbi-Target-apiRoot header, and determine, based on results of the comparison, whether the OCI is valid. FIG. 6 is a block diagram illustrating an exemplary architecture of an NF, such as an SCP, SEPP, or other NF, for validating olcScope information in SBI response messages. Referring to FIG. 6, NF 600 includes at least one processor 602 and a memory 604. SCP 101 further includes an olcScope validator 606 for receiving SBI request messages, obtaining, from the SBI request messages, target resource identification information, using the target resource identification information to obtain NF profile information from an NF profiles database 608, which may be in memory 604, and using the NF profile information to validate olcScope information transmitted in SBI response messages. In an alternate implementation, olcScope validator 606 may query an NF profiles database external to NF 600 to obtain the NF profile information. olcScope validator 606 may be implemented using computer executable instructions stored in memory 604 and executed by processor 602.

Figure 7:
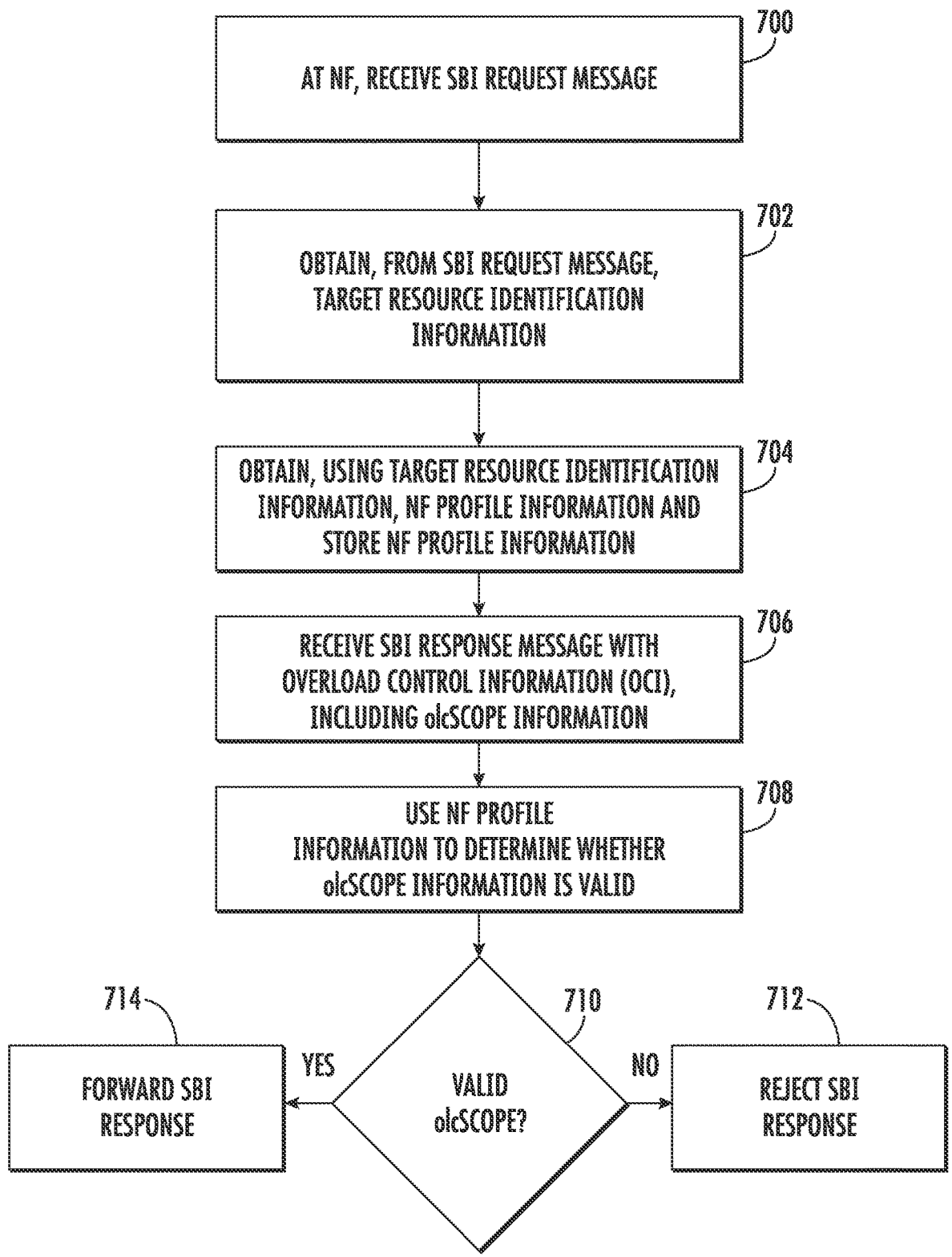
FIG. 7 if a flow chart illustrating an exemplary process performed by an NF for reducing the likelihood of successful DoS attacks by validating OCI scope information against NF profile information obtained using target resource identification information.

FIG. 7 is a flow chart illustrating an exemplary process performed by an NF in validating olcScope information against peer NF identity information. Referring to FIG. 7, in step 700, the process includes receiving, at the NF, an SBI request message. For example, in an indirect communications model, NF 600, which may be an SCP or SEPP, may receive an SBI request message from a consumer NF for forwarding to a producer NF.

In step 702, the process includes obtaining, from the SBI request message, target resource identification information. For example, NF 600 may read values of one or more components the 3gpp-Sbi-Target-apiRoot header of the SBI request message. Examples of such components are illustrated in FIG. 5.

In step 704, NF 600 obtains, using the target resource identification information, NF profile information and stores the NF profile information in memory. For example, NF 600 may utilize one or more of the attribute values from the 3gpp-Sbi-Target-apiRoot header to obtain the NF profile of the NF on which the target resource resides, read attribute values from the NF profile that correspond to any of the OCI scope attributes illustrated in the table in FIG. 2, and store the values of the NF profile attributes in memory.

In step 706, the process includes receiving an SBI response message including a 3gpp-Sbi-Oci header including olcScope information. For example, NF 600 may receive an SBI response message from a legitimate producer NF or from a hacker and including a 3gpp-Sbi-Oci header. The header may include an olcScope component.

In steps 708 and 710, the process includes determining whether the olcScope information is valid using the NF profile information. For example, NF 600 may read one or more values from the olcScope component of the 3gpp-Sbi-Oci header and compare the values read from the olcScope component to one or more stored components of the NF profile obtained using the 3gpp-Sbi-Target-apiRoot header.

In step 710, if the olcScope is determined not to be valid, i.e., if the olcScope information doesn't match the stored NF profile information, control proceeds to step 712 where the SBI response is rejected. If the olcScope information is determined to be valid, i.e., if the olcScope information matches the stored NF profile information, control proceeds to step 714 where the SCP forwards the SBI response to the consumer NF that sent the corresponding SBI request. It should be noted that the forwarding in step 714 is implemented if the node performing the olcScope validation is an SCP or an SEPP. If the node performing the validation is a consumer NF, step 714 may include processing, rather than forwarding, the SBI response.

Advantages of the subject matter described herein include reducing the likelihood of a successful denial of service attack implemented by spoofing the 3gpp-Sbi-Oci header or other similar headers. The subject matter described herein is extensible to other headers similar to the 3gpp-Sbi-Oci header. The subject matter described herein is applicable to both inter-public land mobile network (PLMN) and intra-PLMN signaling. The subject matter described herein can be implemented at the SCP or at other NFs, such as an SEPP or a consumer NF to validate olcScope.

The disclosure of each of the following references is hereby incorporated herein by reference in its entirety.

REFERENCES 1. 3GPP TS 29.500 V17.3.0 (2021-06), 3rd Generation Partnership Project; Technical Specification Group Core Network and Terminals; 5G System; Technical Realization of Service Base Architecture; Stage 3; (Release 17).
2. 3GPP TS 29.501 V17.2.0 (2021-06), 3rd Generation Partnership Project;
   Technical Specification Group Services and System Aspects; System Architecture for the 5G System (5GS), Stage 2; (Release 17).

3. 3GPP TS 29.510 V17.2.0 (2021-06), 3rd Generation Partnership Project; Technical Specification Group Core Network and Terminals; 5G System; Network Function Repository Services; Stage 3; (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for reducing the likelihood of successful denial of service (DoS) attacks by validating scope information associated with overload control information (OCI) against network function (NF) profile information obtained using target resource identification information, the method comprising:
at an NF including at least one processor:
receiving a service based interface (SBI) request message directed to a hacker NF;
obtaining, from the SBI request message, target resource identification information;
obtaining, using the target resource identification information obtained from the SBI request message, NF profile information of the hacker NF and storing the NF profile information of the hacker NF in memory of the NF;
receiving an SBI response message originating from the hacker NF, the SBI response message including the overload control information and the scope information, wherein the overload control information comprises information carried in a Third Generation Partnership Project SBI Overload Control Information (3gpp-Sbi-Oci) header, the overload control information including an overload reduction metric identifying a traffic reduction percentage and the scope information comprises a scope component carried in the 3gpp-Sbi-Oci header, the scope component identifying a network entity to which traffic sent by the NF should be reduced by the traffic reduction percentage;
using the stored NF profile information to determine that the scope information is invalid, wherein using the stored NF profile information to determine that the scope information is invalid includes determining that the hacker NF is not authorized to send the overload control information for the network entity identified by the scope component of the 3gpp-Sbi-Oci header; and
in response to determining that the scope information is invalid, rejecting the SBI response message.

2. The method of claim 1 wherein the obtaining the target resource identification information from the SBI request message includes reading values of one or more components of a 3gpp-Sbi-Target application program interface Root (3gpp-SBi-Target-apiRoot) header of the SBI request message.

3. The method of claim 2 wherein the reading values of one or more components of the 3gpp-Sbi-Target-apiRoot header includes reading values of components that correspond to attributes of the NF profile information of the hacker NF that hosts a target resource identified by the target resource identification information obtained from the SBI request message.

4. The method of claim 3 wherein the obtaining the NF profile information includes using the one or more of the values of the components of the 3gpp-Sbi-Target-apiRoot header to perform a lookup in an NF profiles database and locate the NF profile information of the hacker NF that hosts the target resource.

5. The method of claim 3 wherein the reading the values of the one or more components of the 3gpp-Sbi-Target-apiRoot header that correspond to attributes of the NF profile information of the hacker NF that hosts the target resource includes reading values of one or more of a scheme component, a fully qualified domain name (FQDN) component, a transport layer port component, an apiPrefix component, an apiName component, and an apiVersion component.

6. The method of claim 1 wherein using the NF profile information of the hacker NF to determine that the scope information is invalid includes comparing one or more of an NF-Instance ID, an NF-Set ID, an NF-Service-Instance-ID, an NF-Service-Set ID, a single network slice selection assistance information (S-NSSAI), a destination network name (DNN), a Callback uniform resource identifier (URI), and a service communication proxy (SCP) fully qualified domain name (FQDN) with values of corresponding components of the scope component of the 3gpp-Sbi-Oci header.

7. The method of claim 1 wherein using the NF profile information of the hacker NF to determine that the scope information is invalid includes determining that the scope information is invalid in response to determining that the NF profile information of the hacker NF does not match the scope information.

8. The method of claim 1 wherein the network function comprises a service communication proxy (SCP).

9. The method of claim 1 wherein the NF comprises a security edge protection proxy (SEPP) or a consumer NF.

10. A system for reducing the likelihood of successful denial of service (DoS) attacks by validating scope information associated with overload control information (OCI) against network function (NF) profile information obtained using target resource identification information, the system comprising:
an NF including at least one processor and a memory; and
an overload control scope (olcScope) validator for:
receiving a service based interface (SBI) request message directed to a hacker NF,
obtaining, from the SBI request message, target resource identification information from the SBI request message,
obtaining, using the target resource identification information from the SBI request message, NF profile information of the hacker NF,
storing the NF profile information of the hacker NF in the memory,
receiving an SBI response message originating from the hacker NF, the SBI response message including the overload control information and the scope information,
using the stored NF profile information of the hacker NF to determine that the scope information is invalid, and,
in response to determining that the scope information is invalid, rejecting the SBI response message, wherein the overload control information comprises information carried in a Third Generation Partnership Project SBI Overload Control Information (3gpp-Sbi-Oci) header, the overload control information including an overload reduction metric identifying a traffic reduction percentage and the scope information comprises a scope component carried in the 3gpp-Sbi-Oci header, the scope component identifying a network entity to which traffic sent by the NF should be reduced by the traffic reduction percentage and using the stored NF profile information of the hacker NF to determine that the scope information is invalid includes determining that the hacker NF identified by the NF profile information of the hacker NF is not authorized to send the overload control information for the network entity identified by the scope component of the 3gpp-Sbi-Oci header.

11. The system of claim 10 wherein the olcScope validator is configured to obtain the target resource identification information from the SBI request message by reading values of one or more components from a 3gpp-Sbi-Target application program interface Root (3gpp-SBi-Target-apiRoot) header of the SBI request message.

12. The system of claim 11 wherein the values of the one or more components of the 3gpp-Sbi-Target-apiRoot header comprise values that correspond to attributes of the NF profile information of the hacker NF that hosts a target resource identified by the target resource identification information obtained from the SBI request message.

13. The system of claim 12 wherein the olcScope validator is configured to obtain the NF profile information of the hacker NF by performing perform a lookup in an NF profiles database using values of one or more of the values of the attributes of the 3gpp-Sbi-Target-apiRoot header and locate the NF profile information of the hacker NF that hosts the target resource.

14. The system of claim 12 wherein the values of the one or more components of the 3gpp-Sbi-Target-apiRoot header that correspond to attributes of the NF profile information of the hacker NF that hosts the target resource include values of one or more of a scheme attribute, a fully qualified domain name (FQDN) component, a transport layer port component, an apiPrefix component, an apiName component, and an apiVersion component.

15. The system of claim 10 wherein the olcScope validator is configured to determine whether the scope information is valid by comparing the NF profile information of the hacker NF with the scope information.

16. The system of claim 10 wherein the olcScope validator is configured to determine that the scope information is invalid in response to determining that the NF profile information of the hacker NF does not match the scope information.

17. The system of claim 10 wherein the network function comprises a service communication proxy (SCP), a security edge protection proxy (SEPP), or a consumer NF.

18. A non-transitory computer readable medium having stored thereon executable instructions that when executed by a processor of a computer control the computer to perform steps comprising:
at a network function (NF):
receiving a service based interface (SBI) request message directed to a hacker NF;
obtaining, from the SBI request message, target resource identification information;
obtaining, using the target resource identification information obtained from the SBI request message, NF profile information of the hacker NF and storing the NF profile information of the hacker NF in memory of the NF;
receiving an SBI response message originating from the hacker NF, the SBI response message including overload control information and scope information, wherein the overload control information comprises information carried in Third Generation Partnership Project SBI Overload Control Information (3gpp-Sbi-Oci) header, the overload control information including an overload reduction metric identifying a traffic reduction percentage and the scope information comprises a scope component carried in the 3gpp-Sbi-Oci header, the scope component identifying a network entity to which traffic sent by the NF should be reduced by the traffic reduction percentage;
using the stored NF profile information to determine that the scope information is invalid, wherein using the stored NF profile information of the hacker NF to determine that the scope information is invalid includes determining that the hacker NF identified by the NF profile information of the hacker NF is not authorized to send the overload control information for the network entity identified by the scope component of the 3gpp-Sbi-Oci header; and
in response to determining that the scope information is invalid, rejecting the SBI response message.

* * * * *